(12) United States Patent
Jeyakar M R et al.

(10) Patent No.: US 12,145,416 B2
(45) Date of Patent: Nov. 19, 2024

(54) AIR SUPPLY CONTROL ARRANGEMENT FOR A HEAVY-DUTY VEHICLE COMPRISING A LIFT AXLE

(71) Applicant: Volvo Truck Corporation, Gothenburg (SE)

(72) Inventors: Amarnath Jeyakar M R, Surandai (IN); Sunil Angadi, Dharwad (IN); Dilip Kumar, Bengaluru (IN)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/423,658

(22) Filed: Jan. 26, 2024

(65) Prior Publication Data
US 2024/0262153 A1 Aug. 8, 2024

(30) Foreign Application Priority Data
Feb. 8, 2023 (EP) ..................................... 23155572

(51) Int. Cl.
*B60G 17/052* (2006.01)
*B60G 17/015* (2006.01)

(52) U.S. Cl.
CPC ..... *B60G 17/0523* (2013.01); *B60G 17/0155* (2013.01); *B60G 2202/152* (2013.01)

(58) Field of Classification Search
CPC ............ B60G 17/0523; B60G 17/0155; B60G 2202/152; B60G 2300/402; B60T 17/02
See application file for complete search history.

(56) References Cited

U.S. PATENT DOCUMENTS 4,383,696 A * 5/1983 Picard .................... B62D 61/12
180/209
4,773,670 A * 9/1988 Raidel, II ............... B60G 11/27
280/685

(Continued)

FOREIGN PATENT DOCUMENTS

DE           10207803 A1     4/2004
DE      102017000192 A1 *    7/2018   .............. B60T 13/68

(Continued)

OTHER PUBLICATIONS

Extended European Search Report, European Application No. 23155572.3, mailed Aug. 3, 2023, 6 pages.

*Primary Examiner* — Frank B Vanaman
(74) *Attorney, Agent, or Firm* — Sage Patent Group

(57) ABSTRACT

An air supply control arrangement for a heavy-duty vehicle comprising a lift axle includes a brake chamber. An electronically controlled brake valve device allows pressurized air to be passed to the brake chamber of the lift axle. A pressurized air source supplies pressurized air to the electronically controlled brake valve device along a supply passage. A pilot control valve provided between the pressurized air source and the electronically controlled brake valve device can restrict air flow through the supply passage. A pressure-responsive element actuates the pilot control valve when the pressure in the lift bellow is increased so that the lift axle is raised to a lift condition. The pressure-responsive element closes the pilot control valve. When the pressure in the lift bellow is reduced so that the lift axle is lowered to a ride condition then the pressure-responsive element is deactivated to allow opening of the pilot control valve.

15 Claims, 9 Drawing Sheets

(56) References Cited

U.S. PATENT DOCUMENTS

| | | | |
|---|---|---|---|
| 6,240,339 B1* | 5/2001 | von Mayenburg | ............................ B60G 17/0523 701/72 |
| 2002/0117823 A1* | 8/2002 | Mlsna | .................... B62D 61/12 280/43.23 |
| 2016/0347388 A1* | 12/2016 | Karel | ..................... B60G 11/27 |
| 2017/0144639 A1* | 5/2017 | Minato | ................. B60T 8/1708 |

FOREIGN PATENT DOCUMENTS

| | | |
|---|---|---|
| IN | 00774MU2009 A | 10/2015 |
| WO | 2020163809 A1 | 8/2020 |

* cited by examiner

AIR SUPPLY CONTROL ARRANGEMENT FOR A HEAVY-DUTY VEHICLE COMPRISING A LIFT AXLE

CROSS REFERENCE TO RELATED APPLICATIONS

This application claims priority to European Patent Application No. 23155572.3, filed on Feb. 8, 2023, the disclosure and content of which is incorporated by reference herein in its entirety.

TECHNICAL FIELD

The disclosure relates generally to an air supply control arrangement. In particular aspects, the disclosure relates to an air supply control arrangement for a heavy-duty vehicle comprising a lift axle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

A heavy-duty vehicle may be equipped with a lift axle that can be raised so that its tires do not touch the road surface, for example when driving without any cargo. When the vehicle is heavily loaded, the lift axle can be lowered so that the tires of the lift axle assist in supporting the heavy weight. Being able to raise the lift axle when not needed for load support improves fuel/battery economy. In existing systems, when brakes are applied, the service brakes are normally activated for all axles, including the lift axle, irrespective of if it is in its lifted condition or in its ride condition. Due to this, the consumption of the pressurized air used for braking is increased in each brake cycle. This leads to increase of the compressor duty cycle. For battery electric vehicles this will also reduce the drive range.

SUMMARY

According to a first aspect of the disclosure, there is provided an air supply control arrangement for a heavy-duty vehicle comprising a lift axle which comprises a brake chamber, the air supply control arrangement comprising:
  an electronically controlled brake valve device, which when opened allows pressurized air received in the electronically controlled brake valve device to be passed to the brake chamber, and when closed prevents pressurized air received in the electronically controlled brake valve device from being passed to the brake chamber, wherein the degree of the opening and/or the duration of the opening of the electronically controlled brake valve device is controlled by an electronic brake request received by the electronically controlled brake valve device,
  a supply passage,
  a pressurized air source for supplying pressurized air to the electronically controlled brake valve device along said supply passage,
  a pilot control valve provided in said supply passage between the pressurized air source and the electronically controlled brake valve device, wherein the pilot control valve has a closed first state in which air from the pressurized air source is prevented from reaching the electronically controlled brake valve device and an open second state in which air from the pressurized air source is allowed to be received by the electronically controlled brake valve device,
  a pressure-responsive element configured to actuate the pilot control valve and configured to be in fluid communication with a lift bellow that controls the condition of the lift axle, such that when the pressure in the lift bellow is increased so that the lift axle is raised to a lift condition then the pressure-responsive element is activated to actuate the pilot control valve to move to said closed first state, and when the pressure in the lift bellow is reduced so that the lift axle is lowered to a ride condition then the pressure-responsive element is deactivated to allow the pilot control valve to move to said open second state.

The first aspect of the disclosure may seek to avoid unnecessary braking of the wheels of the lift axle, and thus reduce unnecessary consumption of pressurized air. A technical benefit may include that the brakes of the lift axle do not need to become engaged when the wheels and tires of the lift axle are lifted and thus do not contribute to the travelling motion of the vehicle. However, when the lift axle is in its ride condition, the brakes may be engaged again. When the air supply control arrangement is installed on a vehicle, an automatic controlling of the pilot control valve may be achieved based on lift axle condition. By providing a pressure-responsive element which is configured to affect the movement of the pilot control valve between the closed first state and the open second state based on the pressure in the lift bellow, a simple yet effective switching between the two states of the pilot control valve may be achieved.

In some examples, the pressure-responsive element is part of or is mechanically connected to the pilot control valve, such that when the pressure-responsive element is subjected to the increased pressure that causes the lift axle to be raised to the lift condition, the pressure-responsive element is moved, causing the pilot control valve to be moved to said closed first state. A technical benefit may include that a simple transfer of pressure into a moving force may be achieved. The pressure-responsive element may have a pressure receiving area, the size of which may determine the pressing force on the pressure-responsive element. Thus, in these examples, there is no need for an electronic control signal for changing the state of the pilot control valve. Instead, the "signal" may be provided by a fluid, in particular air, which pushes the pressure-responsive element. Suitably, the pressure-responsive element may be configured to move the pilot control valve to the closed first state only if a defined threshold pressure is reached, in order to avoid closing the pilot control valve by mistake. Such a threshold pressure may suitably be defined in relation to the pressure that is normally applied to the lift bellow when raising the lift axle to the lift condition.

In some examples, the air supply control arrangement may further comprise:
  a bleed conduit configured to be in fluid communication with a feed conduit through which pressurized air is fed to the lift bellow, wherein the bleed conduit is configured to bleed air from the feed conduit to the pressure-responsive element, wherein the pressure-responsive element becomes subjected to the same air pressure as the lift bellow. A technical benefit may include that by subjecting the pressure-responsive element to the same air pressure as the lift bellow an accurate reading of the pressure in the lift bellow may be achieved and therefore an accurate control of the pilot control valve may be achieved. In case of the previously discussed mechanically movement of the pressure-responsive element, the installation thereof may thus be appropriately adapted so that it is caused to move when the pressure required for lifting the lift axle is present in the bleed conduit. However, as will be discussed in more detail later, the pressure-responsive element may in some examples control the pilot control valve electronically. In such examples, the pressure-responsive element may be configured to trigger a signal only when it senses that a defined threshold pressure has been reached, suitably the defined threshold pressure corresponds to the pressure that is required for lifting the lift axle.

In some examples, said pilot control valve is a pressure-actuated pilot control valve. As understood from the above discussion, a technical benefit may include that there is no need for any electronic control of the pilot control valve. Instead, a simple fluid-based control which utilizes fluid pressure to move the pressure-responsive element, which in turn causes the pilot control valve to move, may be provided.

In some examples, the pressure-responsive element comprises a pressure switch which is configured to send an electric signal when activated, wherein the supply control valve is configured to be actuated by the electric signal to move to the closed first state. A technical benefit may include that instead of installing additional conduits for leading fluid to the pilot control valve for controlling the pilot control valve, simple wiring may be drawn to allow electronic signals to be sent to the pilot control valve for the control thereof. The pressure switch may suitably be configured to become activated when the pressure is the lift bellow is sufficient for raising the lift axle to the lift condition. In such examples, the pilot control valve may suitably be a solenoid valve actuated by the electronic signal.

In some examples, the air supply control arrangement further comprises:
 a spring device configured to bias the pilot control valve towards said open second state or towards any further state that allows air from the pressurized air source to be received by the electronically controlled brake valve device. A technical benefit may include that, when the pressure-responsive element does not actuate the pilot control valve, the pilot control valve will automatically allow air from the pressurized air source to be received by the electronically controlled brake valve device. Thus, a brake request can be complied with and the wheels of the lift axle can be subjected to a braking action when the lift axle is in the lowered ride condition. Irrespective of the type of pressure-responsive element (e.g. controlling the movement of the pilot control valve by fluid/mechanical force or by an electric signal), the spring device may suitably be configured to provide a sufficient spring force to avoid inadvertent movement of the pilot control valve. In the case of a mechanical/fluid-based pressure-responsive element that moves based on the force/pressure to which it is subjected, the spring force may suitably be set to be of a magnitude that is slightly below the fluid force that the pressure-responsive element is subjected to when the lift axle is in the lift condition.

In some examples, when the pressure-responsive element is subjected to a pressure which results in the pilot control valve being subjected to an actuating force that is greater than the spring force of the spring device, then the pilot control valve is moved to the closed first state. A technical benefit may include that, irrespective of if it is a fluid force or an electromechanical force that is caused to move the pilot control valve, the spring device may be designed to provide an appropriate spring force to be overcome in order to move the pilot control valve to the closed first state. Thus, the risk of inadvertent closing of the pilot control valve may be reduced.

In some examples, the pressure-responsive element is a first pressure-responsive element, wherein the air supply control arrangement further comprises:
 a second pressure-responsive element configured to be in fluid communication with a main bellow that controls the suspension of the lift axle, such that when the pressure in the main bellow is increased so that the lift axle is suspended by the main bellow then the second pressure-responsive element is activated to actuate the pilot control valve to move to said open second state. A technical benefit may include that when the lift axle is suspended by the main bellow, i.e. the main bellow is pressurized, this is indicated of the lift axle being in a ride condition, thereby a positive controlling of the pilot control valve to move to the open second state may be provided. Furthermore, a movement to the open second state due to pressure on the second pressure-responsive element is indicative of correctly functioning system, without needing to alert the driver of any failure. In particular, by providing a second pressure-responsive element, some errors may be avoided. For example, if the pilot control valve is relied only on the operation of the first pressure-responsive element, any failure in the bleed conduit or the first pressure-responsive element, may upon lack of activation by the first pressure-responsive element be mistaken for the lift axle being in the ride condition. However, by requiring the pressure-responsive element to activate the pilot control valve to move to the open second state when the lift axle is in the ride condition, such mistakes may be avoided. Thus, by providing this second pressure-responsive element, the risk of lack of activation by the first pressure-responsive element will not be mistaken for the lift axle being in the ride condition. In contrast, in some examples the air supply control arrangement may be configured to alert the driver if the pilot control valve does not receive any actuation from any pressure-responsive element, as this may be indicative of system failure.

In some examples, the pilot control valve has an open fail-safe third state in which air from the air source is allowed to be received by the electronically controlled brake valve device, wherein when neither the first pressure-responsive element nor the second pressure-responsive element is activated to actuate the pilot control valve, then the pilot control valve is set in the open fail-safe third state. A technical benefit may include that air to the electronically controlled brake valve device is automatically allowed when neither one of the first and second pressure-responsive elements are activated. Thus, a fail-safe redundancy mode is provided. Since the pilot control valve will not know whether the lift axle is in raised or lowered condition when neither one of the pressure-responsive elements are activated, the fail-safe mode makes sure that braking action can be provided to the lift axle irrespective of it being in the lifted condition or the ride condition.

In some examples, the spring device provides a spring force that urges the pilot control valve towards the open fail-safe third state. A technical benefit may include that the pilot control valve will automatically allow air to reach the electronically controlled brake valve device when neither the first nor the second pressure-responsive element activates the pilot control valve. Thus, the spring device may urge the pilot control valve to a neutral position, corresponding to the open fail-safe third state.

In some examples, the air supply control arrangement further comprises:
an alert switch,
wherein, when the pilot control valve is set in the open fail-safe third state, the alert switch becomes closed, thereby triggering an alert to the driver.
A technical benefit may include that, since the open fail-safe third state is indicative of some failure, because neither one of the pressure-responsive elements have activated the pilot control valve, the driver can hereby be informed of the suspected failure and take an decision to have the vehicle examined and get the vehicle repaired.

In some examples, the pilot control valve comprises two channels:
one channel which, when the pilot control valve is in the open second state, fluidly connects a portion located upstream of the pilot control valve with a portion located downstream of the pilot control valve, the upstream portion extending from the pressurized air source and the downstream portion extending to the electronically controlled brake valve device, and
another channel which, when the pilot control valve is in the open fail-safe third state, fluidly connects said upstream portion with said downstream portion. A technical benefit may include that by having two different channels that allow the pressurized air source to become fluidly connected to said downstream portion, the pilot control valve can be made movable, such as exemplified above. This can enable fluid communication when the lift axle is in its ride condition with a normally functioning activation by the pressure-responsive elements, but also when there is a failure and therefore, as a safety measure, braking engagement should be possible irrespective of the condition of the lift axle.

According to a second aspect of the disclosure, a heavy-duty vehicle is provided. The heavy-duty vehicle comprises:
a lift axle which comprises a brake chamber,
a lift bellow configured to control the condition of the lift axle, such that when the pressure in the lift bellow is increased the lift axle is raised to a lift condition and when the pressure in the lift bellow is reduced the lift axle is lowered to a ride condition, and
the air supply control arrangement according to the first aspect, including any examples thereof. The second aspect of the disclosure may seek to address the corresponding issues and provide the corresponding technical benefits as the air supply control arrangement of the first aspect, including any examples thereof.

In some examples, the heavy-duty vehicle of the second aspect may comprise:
a main bellow that controls the suspension of the lift axle, such that when the pressure in the main bellow is increased the lift axle is suspended by the main bellow. Technical benefits may include those discussed with respect to a main bellow in relation to the air supply control arrangement of the first aspect.

In some examples, the heavy-duty vehicle of the second aspect may comprise:
leaf spring suspension configured to suspend the lift axle. Technical benefits may include at least those discussed with respect to the air supply control arrangement of the first aspect, in particular those examples of the air supply control arrangement that do not necessarily include a reference to a main bellow.

In some examples, the lift bellow may be considered to form part of the air supply control arrangement.

In some examples, the main bellow may be considered to form part of the air supply control arrangement.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The present disclosure teaches that consumption of the pressurized air used for braking may be saved when the lift axle is in its lift condition. This leads to decrease of the compressor duty cycle. For battery electric vehicles this will also increase the drive range.

Figure 1:
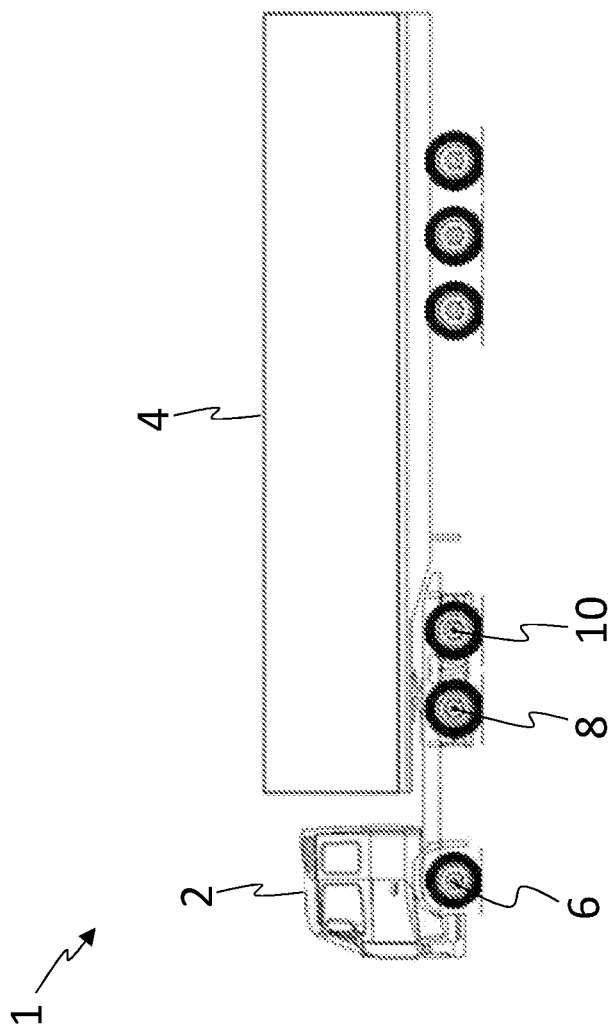
FIG. 1 schematically illustrates a vehicle according to one example of this disclosure.

FIG. 1 schematically illustrates a vehicle 1 according to one example of this disclosure. More specifically, the illustrated vehicle 1 is a heavy-duty vehicle combination which comprises a tractor unit 2 and a trailer unit 4. The tractor unit 2 has three wheel axles 6, 8, 10, each one of the wheel axles 6, 8, 10 having at least one left wheel and at least one right wheel. In this example, the tractor unit 2 has a front axle 6 and two rear axles 8, 10. One of the rear axles 8, 10 may be a lift axle. For example, the two rear axles 8, 10 may be configured such that the lift axle is a pusher axle 8 in front of a drive axle 10. In other examples, the two rear axles 8, 10 may be configured such that the lift axle is a tag axle 10 behind a drive axle 8. It should be understood that the teachings of this disclosure may be implemented for any lift axle, irrespective of its location. Indeed, the teachings of this disclosure are not limited to lift axles on tractor units, but may be implemented for lift axles on trailer units as well, such as full trailers or semi-trailers. Additionally, the teachings of the present disclosure is not limited to a particular vehicle propulsion system, i.e., the teachings herein may be implemented for vehicles propelled by internal combustion engines, traction batteries, fuel cells, hybrid systems, etc. Furthermore, the teachings of the present disclosure may be implemented for driver-operated vehicles and for autonomous (self-driving) vehicles.

Figure 2:
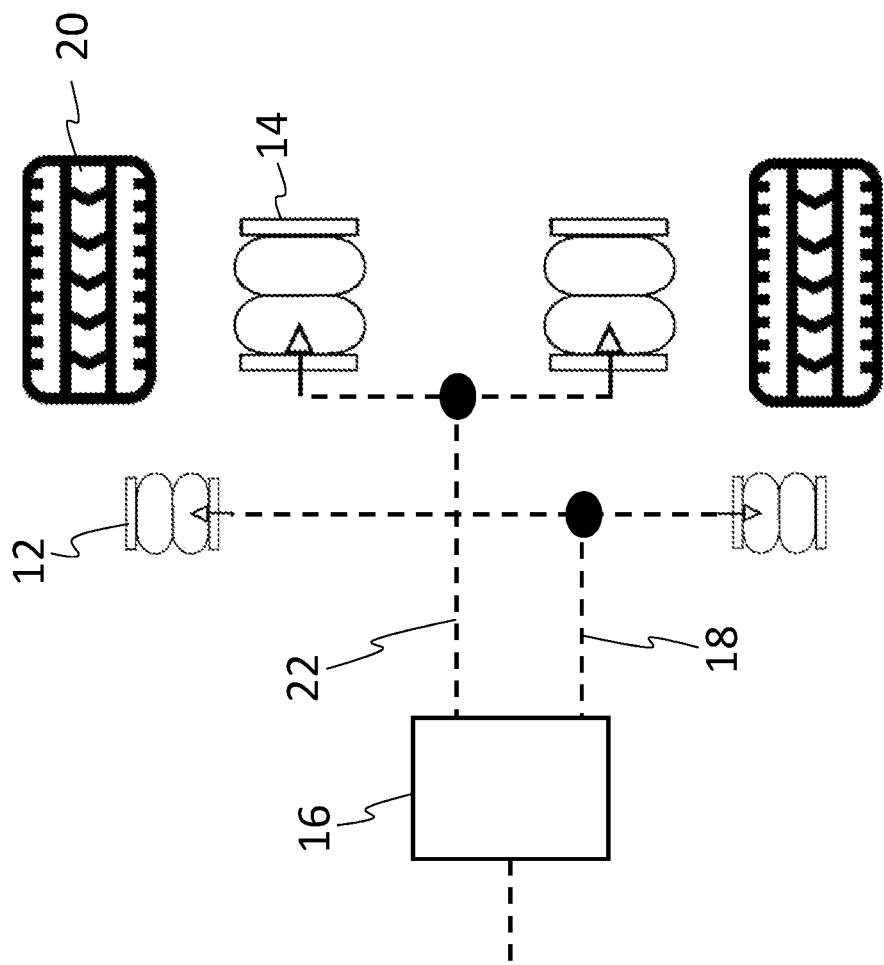
FIG. 2 schematically illustrates lift bellows and main bellows of a lift axle.

FIG. 2 schematically illustrates lift bellows 12 and main bellows 14 of a lift axle according to an example. A heavy-duty vehicle, such as the one previously discussed, may be provided with an electronically controlled suspension valve 16. The suspension valve 16 may be controlled to selectively provide pressurized air to the lift bellows 12 and to the main bellows 14. In order to raise the lift axle from its lowered ride condition to its raised lift condition, the suspension valve 16 may be controlled to pass pressurized air, via a lift bellow pressure line 18, to the lift bellows 12. At the same time, air may be exhausted from the main bellows 14. Because the lift bellows 12 receive air pressure, the lift axle will be raised to its lift condition. The wheels and tires 20 of the lift axle will no longer be in contact with the ground. When the lift axle is to be lowered, the suspension valve 16 may instead be controlled to pass pressurized air, via a main bellow pressure line 22, to the main bellows 14, and air may be exhausted from the lift bellows 12. This will lower the lift axle to the ride position and the main bellows 14, now being pressurized, will provide appropriate suspension of the lift axle. In other examples, the lift axle may be suspended by leaf spring suspension. In the ride condition of the lift axle, the tires 20 will be rolling along the ground as the vehicle is propelled forwards or in reverse.

Figure 3:
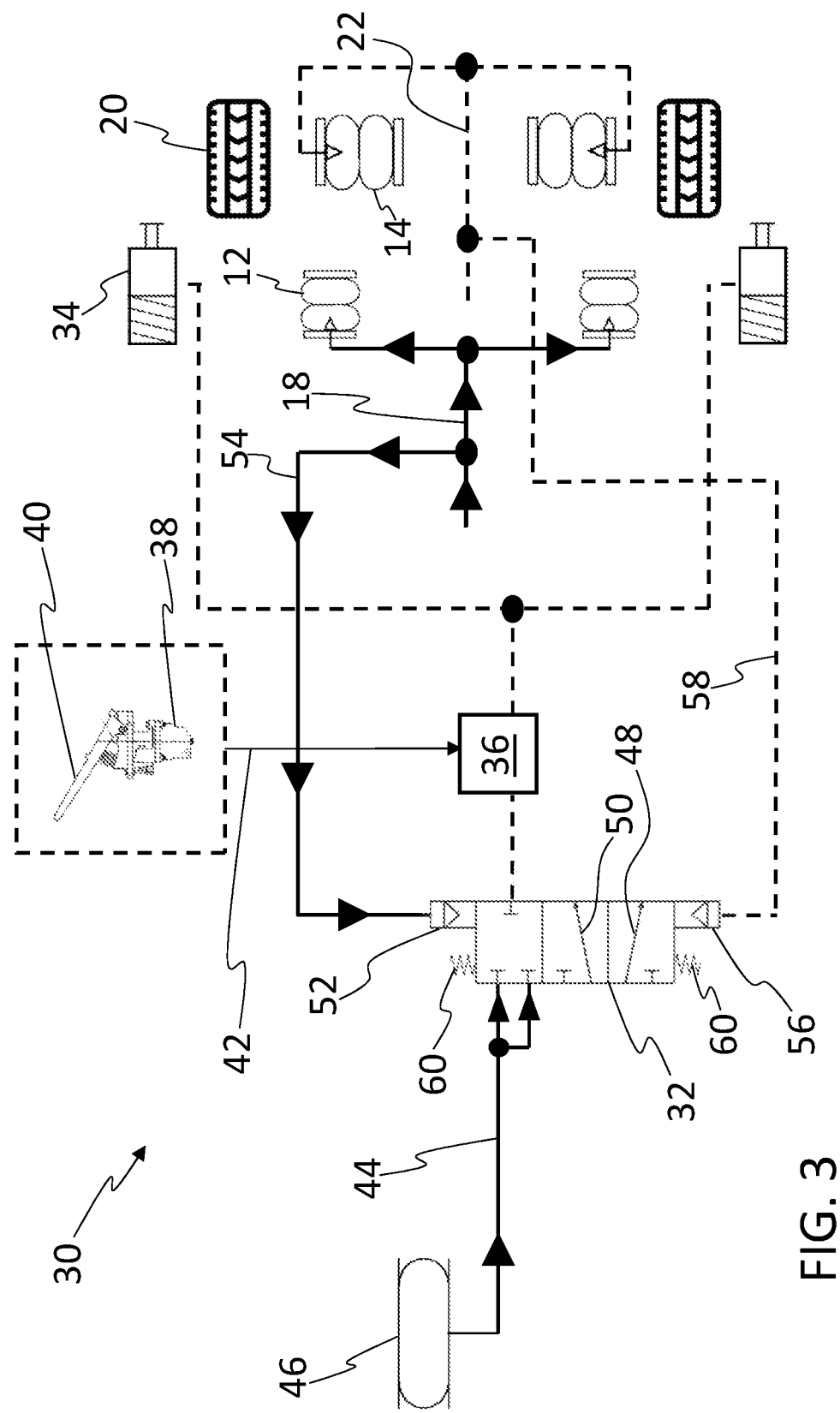
FIGS. 3, 4, and 5 schematically illustrate an air supply control arrangement according to one example of this disclosure, wherein a pilot control valve is presented in three different states.
Figure 4:
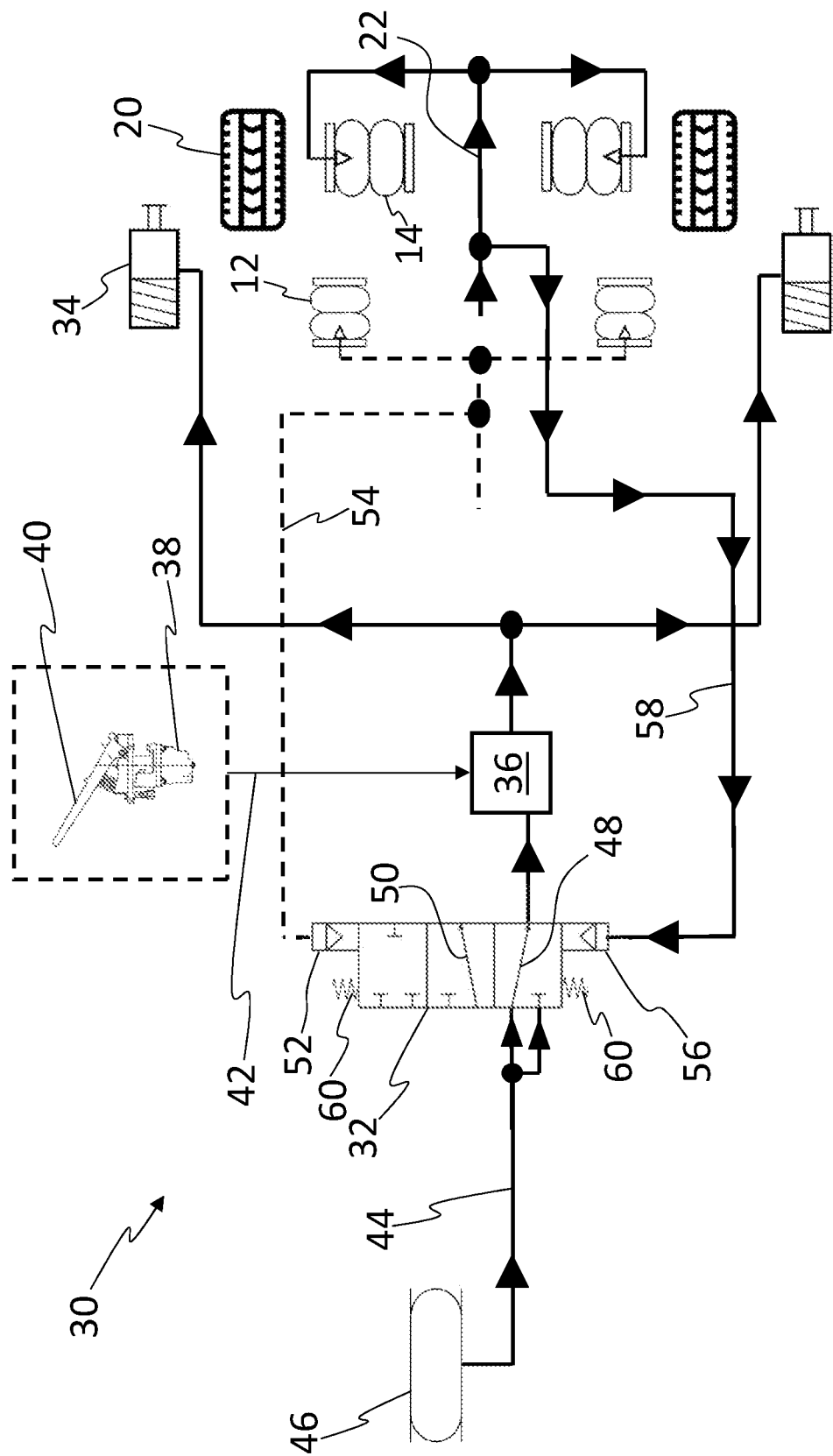
Figure 5:
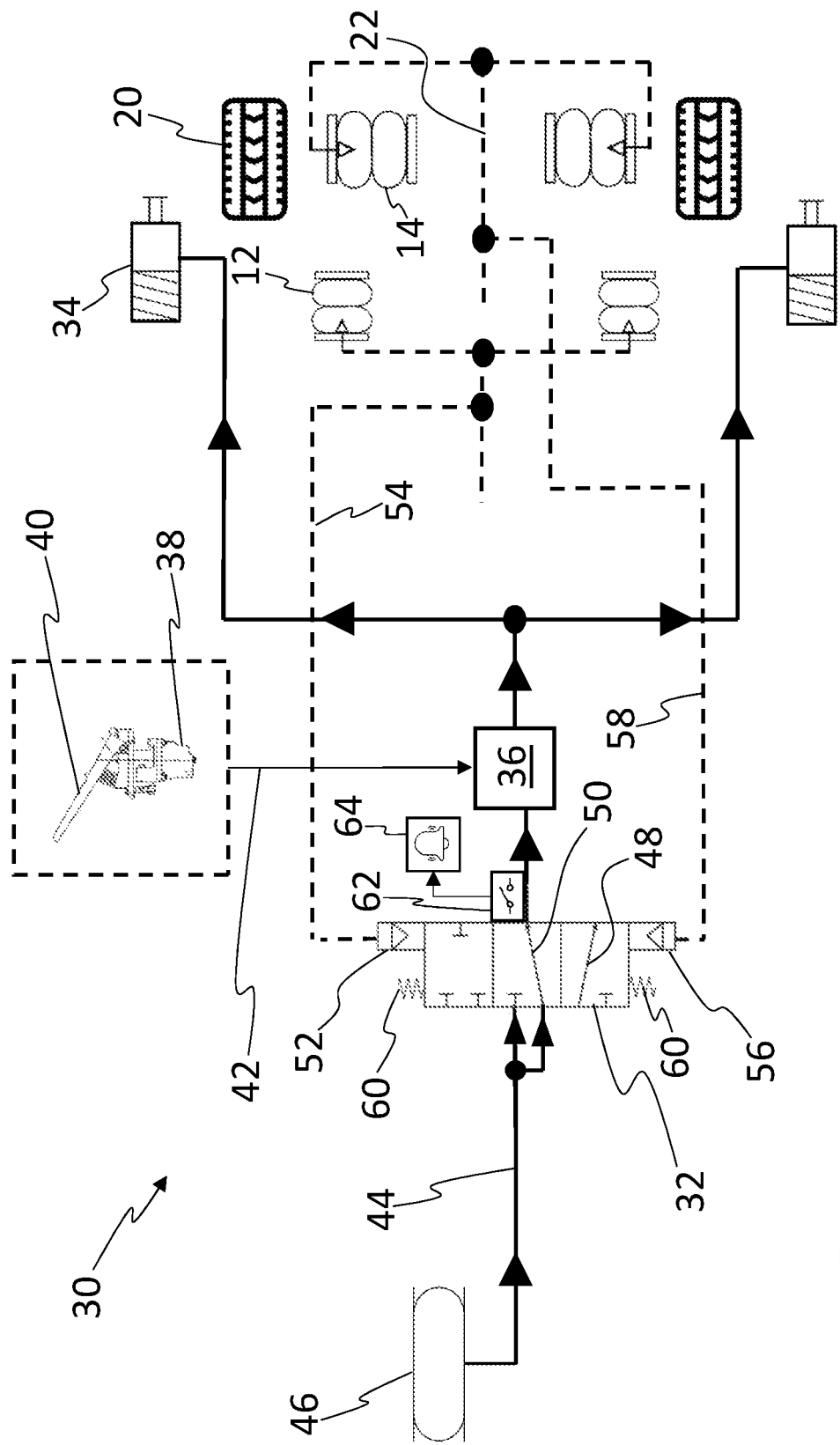

FIGS. 3-5 schematically illustrates an air supply control arrangement 30 according to one example of this disclosure, wherein a pilot control valve 32 is presented in three different states. Starting with FIG. 3, the air supply control arrangement 30 may be provided in a heavy-duty vehicle comprising a lift axle which comprises a brake chamber 34. In particular, two brake chambers 34 are illustrated, one for each wheel of the lift axle. An example of such a heavy-duty vehicle is illustrated in FIG. 1. However, the air supply control arrangement 30 in FIG. 3 may also be implemented for other examples of heavy-duty vehicles. The air supply control arrangement 30 comprises an electronically controlled brake valve device 36. The electronically controlled brake valve device 36 may be controlled by a foot brake modulator 38 which translates the movements of a foot brake pedal 40 into a brake request 42. Thus, when the electronically controlled brake valve device 36 receives the brake request 42 (e.g. in the form of an electric brake signal), the electronically controlled brake valve device 36 is opened. When the electronically controlled brake valve device 36 is opened it allows pressurized air received in the electronically controlled brake valve device 36 to be passed to the brake chambers 34 of the lift axle. When the electronically controlled brake valve device 36 is closed, pressurized air received in the electronically controlled brake valve device 36 is prevented from being passed to the brake chambers 34. The degree of the opening and/or the duration of the opening of the electronically controlled brake valve device 36 is controlled by the brake request 42 from the foot brake modulator 38.

The pilot control valve 32 of the air supply control arrangement 30 can be positioned in different states in order to either allow pressurized air to reach the electronically controlled brake valve device 36 or prevent pressurized air from reaching the electronically controlled brake valve device 36. If the electronically controlled brake valve device 36 is prevented from receiving pressurized air, there will be no air passed to the brake chambers 34 even if a brake request 42 has been sent to the electronically controlled brake valve device 36.

The pilot control valve 32 is provided in a supply passage 44. A pressurized air source 46 is provided for supplying pressurized air to the electronically controlled brake valve device 36 along the supply passage 44. The pressurized air source 46 is illustrated in the form of a tank containing pressurized air. The tank may, for instance, become pressurized by means of a compressor. The general inventive concept is, however, not limited to using an air supply control arrangement in connection with a specific type of pressurized air source.

The pilot control valve 32 is provided in the supply passage 44 between the pressurized air source 46 and the electronically controlled brake valve device 36. The pilot control valve 32 can be positioned in three different states. In FIG. 3, the pilot control valve 32 is set in a closed first state in which air from the pressurized air source 46 is prevented from reaching the electronically controlled brake valve device 36. In FIG. 4, the pilot control valve 32 is set in an open second state in which air from the pressurized air source 46 is allowed to be received by the electronically controlled brake valve device 36. In FIG. 5, the pilot control valve 32 is set in an open fail-safe third state in which air from the pressurized air source 46 is allowed to be received by the electronically controlled brake valve device 36. In particular, it may be noted that the pilot control valve 32 comprises two channels 48, 50. When the pilot control valve 32 is in the open second state (FIG. 4), one channel 48 connects a portion located upstream of the pilot control valve 32 with a portion located downstream of the pilot control valve 32. The upstream portion extends from the pressurized air source 46 and the downstream portion extends to the electronically controlled brake valve device 36. When the pilot control valve 32 is in the open fail-safe third state (FIG. 5), another channel 50 fluidly connects the upstream portion with the downstream portion. In the closed first state (FIG. 3) neither one of the channels 48, 50 enables fluid communication through the pilot control valve 32.

Continuing with FIG. 3, the air supply control arrangement 30 further comprises a first pressure responsive element 52 configured to actuate the pilot control valve 32. The first pressure-responsive element 52 is configured to be in fluid communication with the lift bellows 12 that control the condition of the lift axle. As illustrated in FIG. 3, the lift bellows 12 may receive pressurized air via a lift bellow pressure line 18. For instance, a suspension valve (not shown in FIG. 3), such as the suspension valve 16 in FIG. 2, may be controlled to pass pressurized air, via the lift bellow pressure line 18, to the lift bellows 12. The lift bellow pressure line 18 may also be referred to as a feed conduit 18, through which pressurized air is fed to the lift bellows 12. As seen in FIG. 3, the air supply control arrangement 30 according to this example may comprise a bleed conduit 54 which is in fluid communication with the feed conduit 18. The bleed conduit 54 is configured to bleed air from the feed conduit 18 to the first pressure-responsive element 52. Hereby, the first pressure-responsive element 52 may become subjected to the same air pressure as the lift bellows 12. The first pressure-responsive element 52 is, in this example, illustrated as being part of, or at least mechanically connected to the pilot control valve 32, such that when the first pressure-responsive element 52 is subjected to the increased pressure that causes the lift axle to be raised to the lift condition, the first pressure-responsive element 52 is moved, causing the pilot control valve 32 to be moved to the closed first state, as illustrated in FIG. 3.

From the above, it can be understood that when the pressure in the lift bellows 12 is increased so that the lift axle is raised to its lift condition, then the first pressure-responsive element 52 becomes activated to actuate the pilot control valve 32 to move to the illustrated first closed state. In contrast, when the pressure in the lift bellow 12 is reduced so that the lift axle is lowered to a ride condition then the first pressure-responsive element 52 is deactivated, i.e. in this example, it will no longer urge the pilot control valve 32 towards the closed first state. Instead the first pressure-responsive element 52 will now allow the pilot control valve 32 to move to the open second state.

As illustrated in FIG. 3, in the closed first state of the pilot control valve 32, even if the driver presses the foot brake pedal 40, there will be no brake action on the wheels of the lift axle. Since the pilot control valve 32 prevents pressurized air to be passed from the pressurized air source 46 to the electronically controlled brake valve device 36, even if the latter opens due to receipt of a brake request 42, it will not pass any pressurized air to the brake chambers 34 of the lift axle. Corresponding brake requests will of course also be sent to other electronically controlled brake valve devices which are associated with other axles of the vehicle, thereby allowing braking of the vehicle. But for the lift axle, when it is in the lifted condition, pressurized air will not be wasted.

As illustrated in FIG. 3, the air supply control arrangement 30 may further comprise a second pressure-responsive element 56. The second pressure-responsive element 56 may be in fluid communication with the main bellows 14 that control the suspension of the lift axle. In FIG. 3, there are two main bellows 14 that control the suspension of the lift axle, providing comfortable ride condition. The second pressure-responsive element 56 may thus be in fluid communication with both main bellows 14. As previously discussed in relation to FIG. 2, the main bellows 14 may receive pressurized air via a main bellow pressure line 22, and a suspension valve (not shown in FIG. 3) may be controlled to pass pressurized air, via the main bellow pressure line 22, to the main bellows 14. As seen in FIG. 3, another bleed conduit 58 may be provided in fluid communication with the main bellow pressure line 22, so as to provide the same pressure to the second pressure-responsive element 56 as the pressure provided to the main bellows 14. When the pressure in the main bellows 14 is increased so that the lift axle is suspended by the main bellows 14, then the second pressure-responsive element 56 is activated to actuate the pilot control valve 32 to move to the open second state, which is illustrated in FIG. 4.

Thus, FIG. 4 illustrates the air supply control arrangement 30 when the lift axle is in its lowered ride condition and the tires 20 of the lift axle are contributing to propelling the vehicle. Now, the lift bellows 12 are no longer pressurized, and therefore there is no pressurized air pushing the first pressure-responsive element 52. Instead, now the main bellows 14 are pressurized and the second pressure-responsive element 56 is subjected to the corresponding pressure, whereby the second pressure-responsive element 56 has pushed the pilot control valve 32 upwardly in FIG. 4 (compared to the position of the pilot control valve 32 in FIG. 3). As shown in FIG. 4, in this open second state, the pilot control valve 32 allows pressurized air to be passed from the pressurized air source 46 to the electronically controlled brake valve device 36. Thus, when the electronically controlled brake valve device 36 receives a brake request 42, the electronically controlled brake valve device 36 will open and allow the pressurized air to be passed to the brake chambers 34, thereby subjecting the wheels of the lift axle (which is not in its ride condition) to appropriate brake action.

The closed first state and the open second state illustrated in FIGS. 3 and 4, respectively, are the two states that the pilot control valve 32 will be set in under normal operating conditions. However, as a precaution, the pilot control valve 32 may also have an open fail-safe third state, just in case there would for some reason occur a failure. For example, at least one of the first and second pressure-responsive elements 52, 56 no longer works properly or the fluid communication to the pressure-responsive elements 52, 56 have failed (e.g. due to leakage). This open fail-safe third state will be discussed in more detail with respect to FIG. 5.

Thus, as illustrated in the example in FIG. 5 by the dashed lines, neither one of the pressure-responsive elements 52, 56 are subjected to any pressurized air. This may, e.g. be due to leakage or other malfunctioning, for example, the air supply or the suspension valve may not be working properly. This means that, irrespective of the lift axle being in lift condition or in ride condition, as a safety measure, the pilot control valve 32 not being "aware" of the current condition, should now allow the air to pass to the electronically controlled brake valve device 36. Because if the lift axle is in ride condition, it is desirable to have functioning brake action on the lift axle.

As illustrated in FIG. 5 (and also illustrated in FIGS. 3 and 4), the air supply control arrangement 30 may further comprise a spring device 60. In this example, the spring device 60 is configured to bias the pilot control valve 32 towards the open fail-safe third state, in which air from the pressurized air source 46 is allowed to be received by the electronically controlled brake valve device 36. Hereby, a brake request 42 will result in the brake chambers 34 receiving pressurized air and the wheels of the lift axle will be subjected to a brake action.

It should be understood that the spring force of the spring device 60 is appropriately dimensioned based on the pressure that is used for lifting the lift axle (i.e. for pressurizing the lift bellows 12) and the pressure that is used for suspending the lift axle (i.e. for pressurizing the main bellows 14). When either one of the pressure-responsive elements 52, 56 are subjected to a pressure (from the associated bleed conduit 54, 58) which results in an actuating force that is greater than the spring force, then the pilot control valve 32 can be moved to the closed first state or the open second state, respectively.

As illustrated in FIG. 5, the air supply control arrangement 30 may further comprise an alert switch 62, wherein, when the pilot control valve 32 is set in the open fail-safe third state, the alert switch 62 becomes closed, thereby triggering an alert 64 to the driver. In the illustrated example of a pilot control valve 32, the open fail-safe state is reached when the pilot control valve 32 is in a neutral center position. For example, in FIG. 3, the pilot control valve 32 has been pushed in one direction (downwards in the drawing) to reach the closed first state, and in FIG. 4, the pilot control valve 32 has been pushed in the opposite direction (upwards in the drawing) to reach the open second state, and in FIG. 5, the pilot control valve 32 has assumed its neutral center position. When the pilot control valve 32 is moved from the closed first state to the open second state, or vice versa, the pilot control valve 32 will pass through its open fail-safe third state. In order to avoid triggering the alert 64 during normal well-functioning operating conditions, the alert switch 62 may suitably include a time-delay function. For instance, in some examples, the alert switch 62 may include a time-delayed mechanical switch. The mechanical switch may, for example, be triggered by air pressure. By having a time-delay, a quick transition between the first closed state and the second open state (via the third state) will not trigger the alert 64. It should be understood that the pilot control valve 32 illustrated herein is just one example. Other examples of pilot control valves may naturally be used when implementing the teachings of this disclosure. For instance, the pilot control valve may be configured such that the open fail-safe third state is at an end position of the pilot control valve, in which case time-delay functionality of an alert switch may be omitted.

In the example in FIGS. 3-5 the pilot control valve 32 is a pressure-actuated pilot control valve. More specifically, the pressure-responsive elements 52, 56 are mechanically movable when subjected to high enough pressure. The pilot control valve 32 follows the movements of the pressure-responsive element 52, 56, thereby enabling the pilot control valve 32 to change from one state to another. However, in other examples, the pressure-responsive element or elements may be configured to control the pilot control valve electrically. This will now be discussed in relation to FIG. 6.

Figure 6:
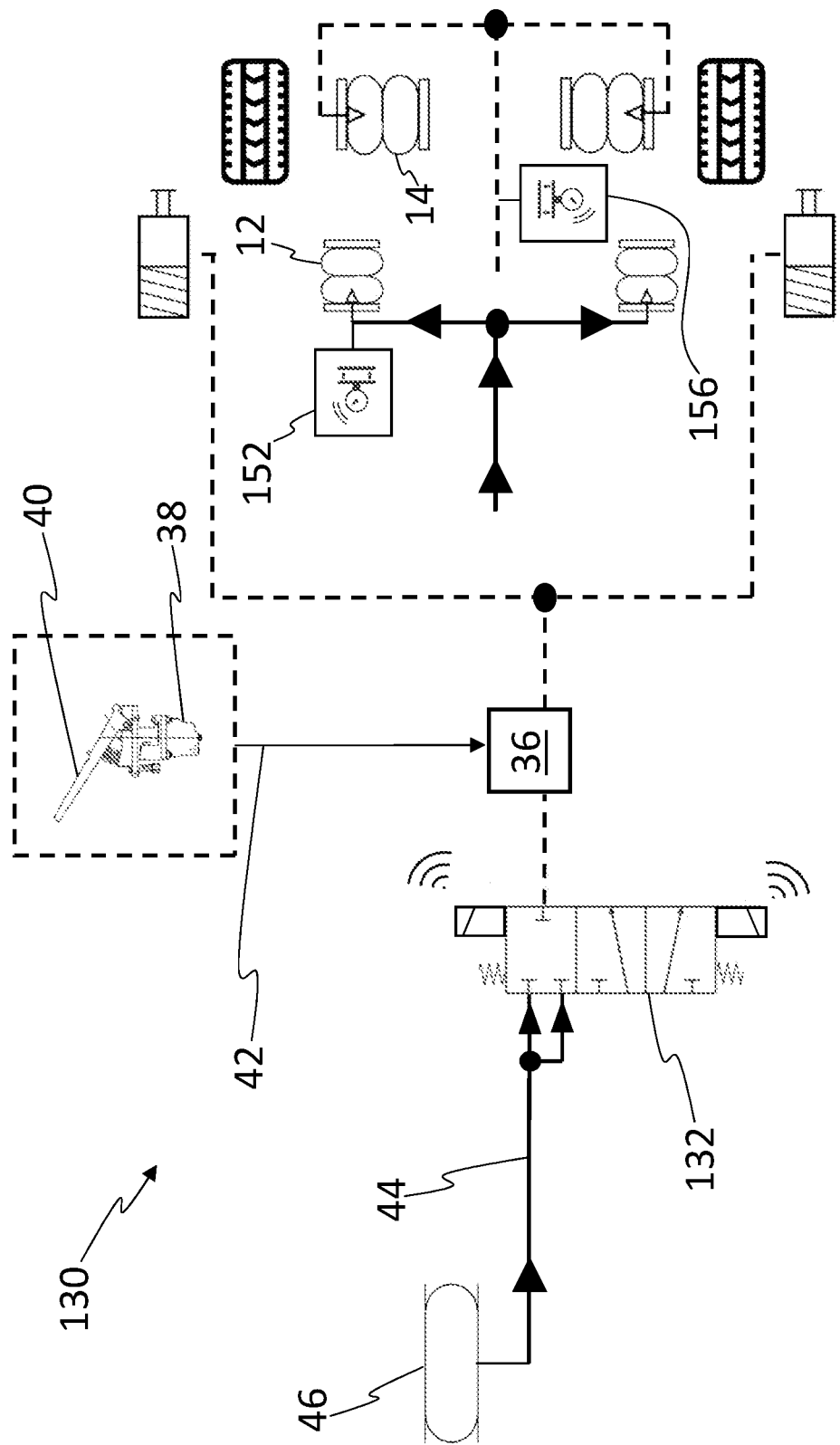
FIG. 6 schematically illustrates an air supply control arrangement according to another example of this disclosure.

FIG. 6 schematically illustrates an air supply control arrangement 130 according to another example of this disclosure. Similarly to the previous example, in this example there is provided a first pressure-responsive element 152 which is in fluid communication with the lift bellows 12, and a second pressure-responsive element 156 which is in fluid communication with the main bellows 14. Unlike the previous examples, in which the pressurized air was bled via a bleed conduit to provide a fluid pressure for causing a mechanical pushing effect on the pilot control valve, in the example of FIG. 6, electric signals are instead used to effect the pilot control valve 132. Each one of the pressure-responsive elements 152, 156 comprises a pressure switch which is configured to send an electric signal when activated, wherein the pilot control valve 132 is configured to be actuated by the electric signal to move to the closed first state or the open second state, respectively, depending on which one of the pressure switches that has become closed. Although for simplicity the electric signaling is here illustrated as including wireless communication, it should be understood that wired communication between the pressure-responsive elements 152, 156 (in particular, the pressure switches of the pressure-responsive elements 152, 156) and the pilot control valve 132 is also encompassed by this disclosure. In the example in FIG. 6, the pilot control valve 132 may suitably be a solenoid valve.

Figure 7:
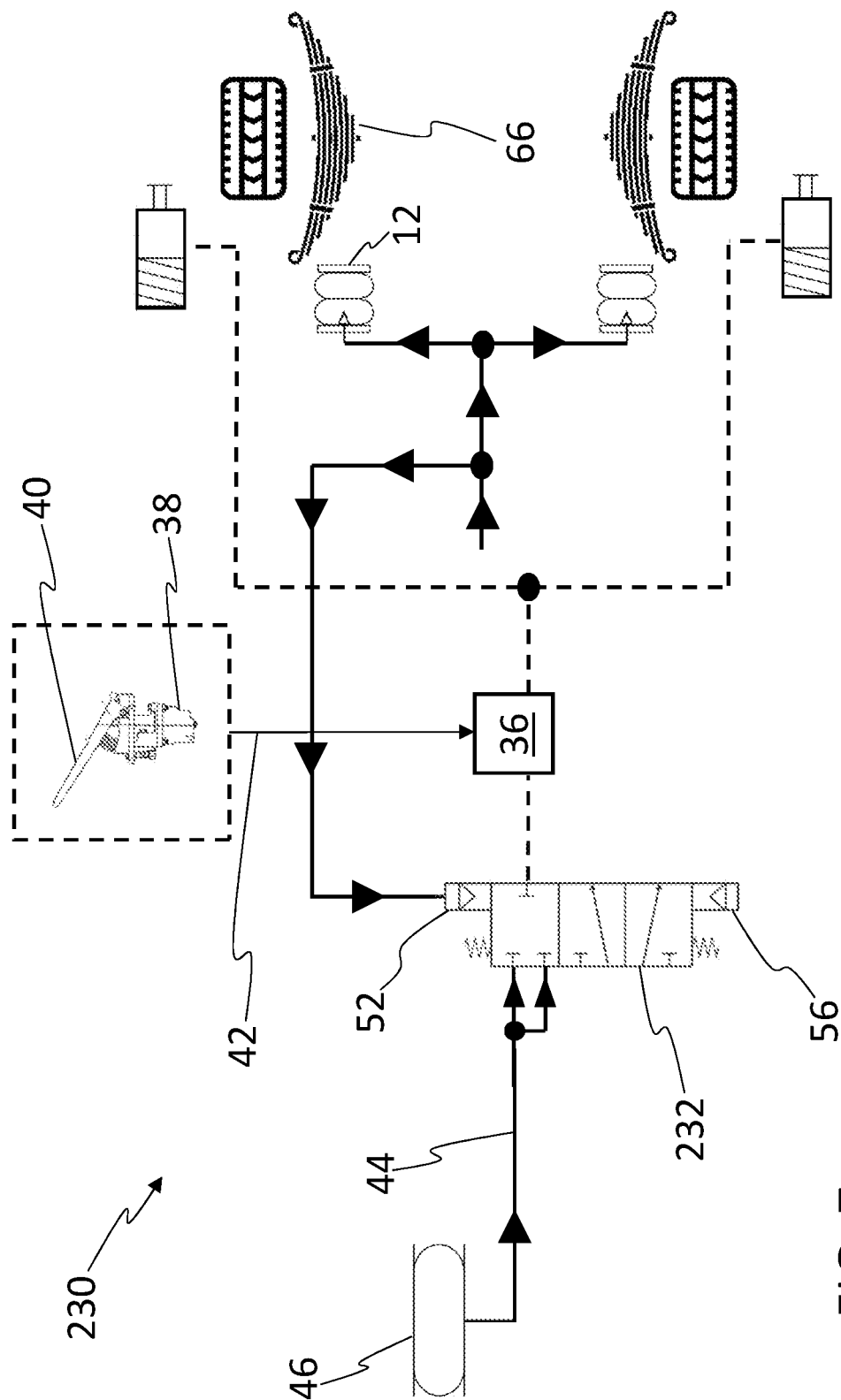
FIGS. 7-8 schematically illustrates an air supply control arrangement according to yet another example of this disclosure, wherein a pilot control valve is presented in two different states.
Figure 8:
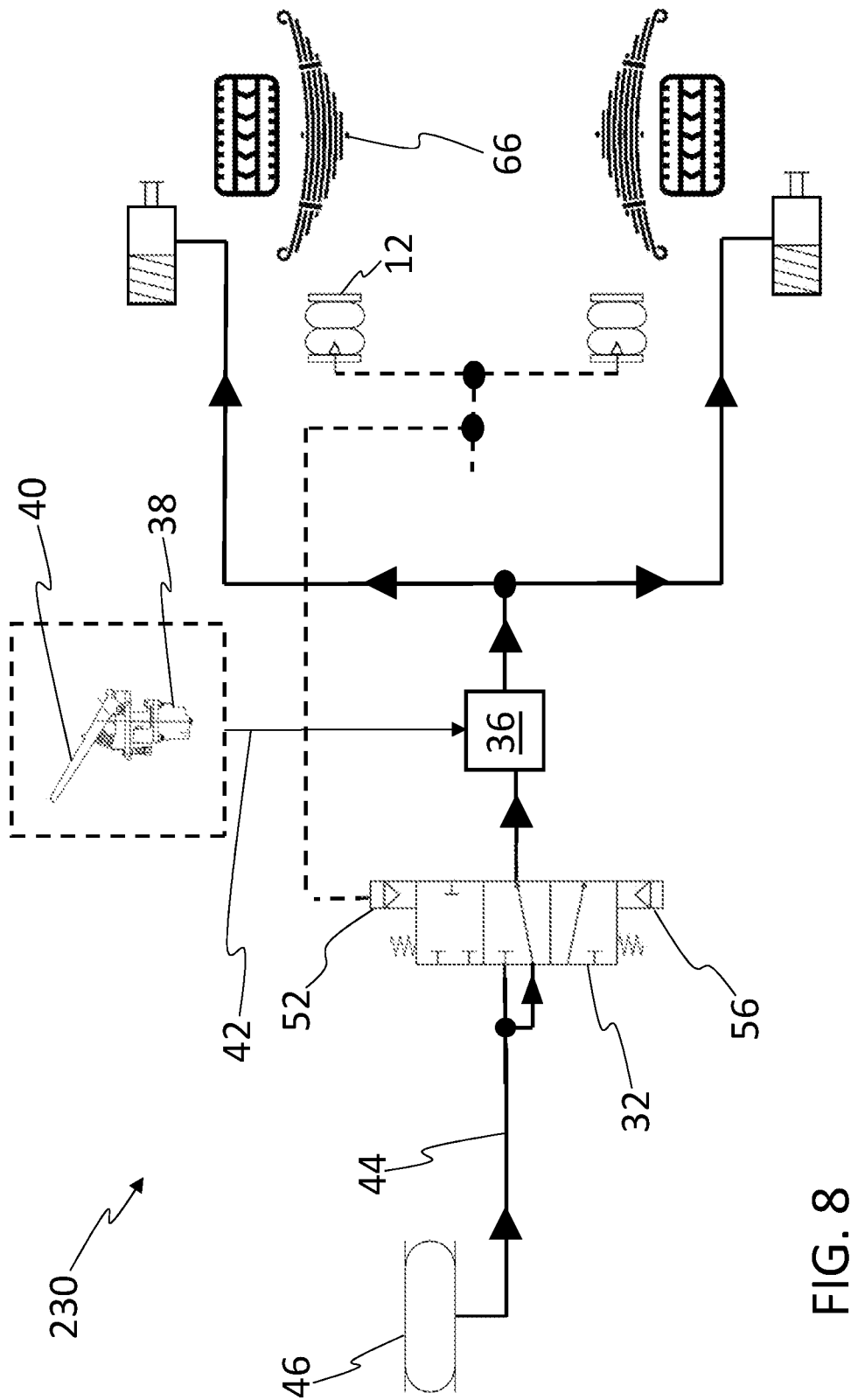

FIGS. 7-8 schematically illustrates an air supply control arrangement 230 according to yet another example of this disclosure, wherein the pilot control valve 32 is presented in two different states. In the previously shown examples, the lift axle was suspended by main bellows. However, the air supply control arrangement may also be implemented in vehicles in which the lift axle is suspended by leaf springs 66. The same pilot control valve 32 can be used in this implementation.

As can be seen in FIG. 7, when the lift bellows 12 is pressurized, the first pressure-responsive element 52 will actuate the pilot control valve 32 to set it in the closed first state, i.e. similarly to the example in FIG. 3. Since there are no main bellows in the example in FIG. 7, and thus no input to the second pressure-responsive element 56 (which may suitably be omitted for leaf spring implementations), there will only be one open state, i.e. there will be no separate open second state and open fail-safe third state. As illustrated in FIG. 8, when the lift bellows 12 is not pressurized, the first pressure-responsive element 52 will not urge the pilot control valve 32 to move, and the spring force will cause the pilot control valve 32 to be set in the open second state (which position-wise corresponds to the open fail-safe third state in FIG. 5). However, even if the lift bellows 12 would be pressurized, but the first pressure-responsive element 52 is malfunctioning for some reason, the pilot control valve 32 would still be set in the same position as shown in FIG. 8. Thus, this position represents both the pilot control valve 32 in open second state under normal operating conditions, and the pilot control valve 32 in open fail-safe third state when a malfunctioning has occurred.

Figure 9:
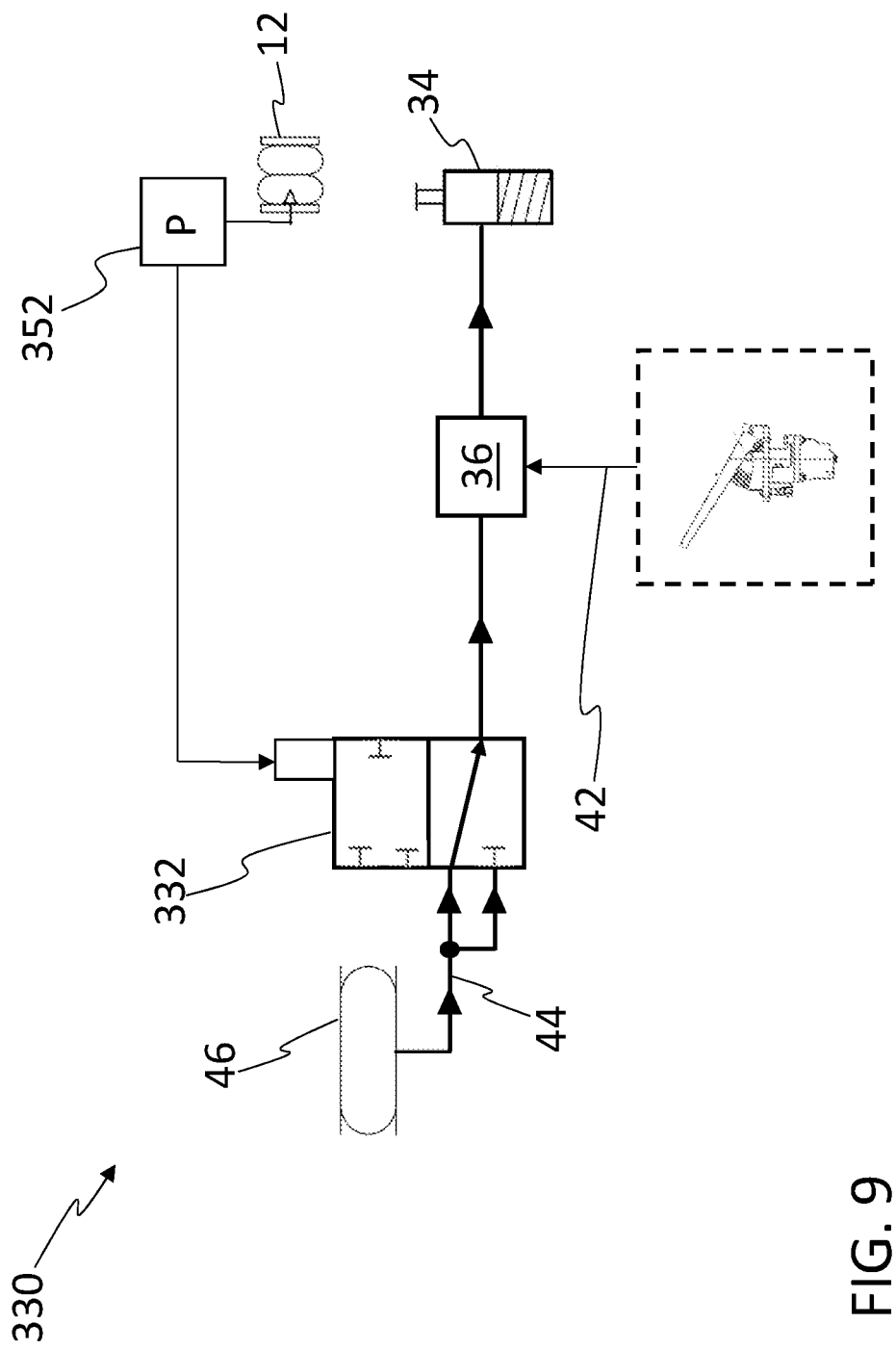
FIG. 9 schematically illustrates an air supply control arrangement according to a further example of this disclosure.

FIG. 9 schematically illustrates an air supply control arrangement 330 according to a further example of this disclosure. The air supply control arrangement 330 comprises an electronically controlled brake valve device 36, which when opened allows pressurized air received in the electronically controlled brake valve device 36 to be passed to the brake chamber 34, and when closed prevents pressurized air received in the electronically controlled brake valve device 36 from being passed to the brake chamber 34, wherein the degree of the opening and/or the duration of the opening of the electronically controlled brake valve device 36 is controlled by an electronic brake request 42 received by the electronically controlled brake valve device 36. The air supply control arrangement 330 further comprises a supply passage 44, and a pressurized air source 46 for supplying pressurized air to the electronically controlled brake valve device 36 along said supply passage 44. The air supply control arrangement 330 further comprises a pilot control valve 332 provided in said supply passage 44 between the pressurized air source 46 and the electronically controlled brake valve device 36, wherein the pilot control valve 332 has a closed first state in which air from the pressurized air source 46 is prevented from reaching the electronically controlled brake valve device 36 and an open second state in which air from the pressurized air source 46 is allowed to be received by the electronically controlled brake valve device 36 (in FIG. 9, the pilot control valve 332 is illustrated in its open second state). The air supply control arrangement 330 further comprises a pressure-responsive element 352 configured to actuate the pilot control valve 332 and configured to be in fluid communication with a lift bellow 12 that controls the condition of the lift axle, such that when the pressure in the lift bellow 12 is increased so that the lift axle is raised to a lift condition then the pressure-responsive element 352 is activated to actuate the pilot control valve 332 to move to said closed first state, and when the pressure in the lift bellow 12 is reduced so that the lift axle is lowered to a ride condition then the pressure-responsive element 352 is deactivated to allow the pilot control valve 332 to move to said open second state.

Example 1: An Air Supply Control Arrangement for a Heavy-Duty Vehicle comprising a lift axle
which comprises a brake chamber, the air supply control arrangement comprising:
    an electronically controlled brake valve device, which when opened allows pressurized air received in the electronically controlled brake valve device to be passed to the brake chamber, and when closed prevents pressurized air received in the electronically controlled brake valve device from being passed to the brake chamber, wherein the degree of the opening and/or the duration of the opening of the electronically controlled brake valve device is controlled by an electronic brake request received by the electronically controlled brake valve device, a supply passage, a pressurized air source for supplying pressurized air to the electronically controlled brake valve device along said supply passage, a pilot control valve provided in said supply passage between the pressurized air source and the electronically controlled brake valve device, wherein the pilot control valve has a closed first state in which air from the pressurized air source is prevented from reaching the electronically controlled brake valve device and an open second state in which air from the pressurized air source is allowed to be received by the electronically controlled brake valve device, a pressure-responsive element configured to actuate the pilot control valve and configured to be in fluid communication with a lift bellow that controls the condition of the lift axle, such that when the pressure in the lift bellow is increased so that the lift axle is raised to a lift condition then the pressure-responsive element is activated to actuate the pilot control valve to move to said closed first state, and when the pressure in the lift bellow is reduced so that the lift axle is lowered to a ride condition then the pressure-responsive element is deactivated to allow the pilot control valve to move to said open second state.

Example 2: The air supply control arrangement according to Example 1, wherein the pressure-responsive element is part of or is mechanically connected to the pilot control valve, such that when the pressure-responsive element is subjected to the increased pressure that causes the lift axle to be raised to the lift condition, the pressure-responsive element is moved, causing the pilot control valve to be moved to said closed first state.

Example 3: The air supply control arrangement according to any one of Examples 1-2, further comprising:

a bleed conduit configured to be in fluid communication with a feed conduit through which pressurized air is fed to the lift bellow, wherein the bleed conduit is configured to bleed air from the feed conduit to the pressure-responsive element, wherein the pressure-responsive element becomes subjected to the same air pressure as the lift bellow.

Example 4: The air supply control arrangement according to any one of Examples 1-3, wherein said pilot control valve is a pressure-actuated pilot control valve.

Example 5: The air supply control arrangement according to Example 1, wherein the pressure-responsive element comprises a pressure switch which is configured to send an electric signal when activated, wherein the supply control valve is configured to be actuated by the electric signal to move to the closed first state.

Example 6: The air supply control arrangement according to any one of Examples 1-5, further comprising:

a spring device configured to bias the pilot control valve towards said open second state or towards any further state that allows air from the pressurized air source to be received by the electronically controlled brake valve device.

Example 7: The air supply control arrangement according to Example 6, wherein when the pressure-responsive element is subjected to a pressure which results in the pilot control valve being subjected to an actuating force that is greater than the spring force of the spring device, then the pilot control valve is moved to the closed first state.

Example 8: The air supply control arrangement according to any one of Examples 1-7, wherein the pressure-responsive element is a first pressure-responsive element, wherein the air supply control arrangement further comprises:

a second pressure-responsive element configured to be in fluid communication with a main bellow that controls the suspension of the lift axle, such that when the pressure in the main bellow is increased so that the lift axle is suspended by the main bellow then the second pressure-responsive element is activated to actuate the pilot control valve to move to said open second state.

Example 9: The air supply control arrangement according to Example 8, wherein the pilot control valve has an open fail-safe third state in which air from the pressurized air source is allowed to be received by the electronically controlled brake valve device, wherein when neither the first pressure-responsive element nor the second pressure-responsive element is activated to actuate the pilot control valve, then the pilot control valve is set in the open fail-safe third state.

Example 10: The air supply control arrangement according to Example 9, wherein the spring device provides a spring force that urges the pilot control valve towards the open fail-safe third state.

Example 11: The air supply control arrangement according to any one of Examples 9-10, further comprising:

an alert switch, wherein, when the pilot control valve is set in the open fail-safe third state, the alert switch becomes closed, thereby triggering an alert to the driver.

Example 12: The air supply control arrangement according to any one of Examples 1-11 wherein the pilot control valve comprises two channels:

one channel which, when the pilot control valve is in the open second state, fluidly connects a portion located upstream of the pilot control valve with a portion located downstream of the pilot control valve, the upstream portion extending from the pressurized air source and the downstream portion extending to the electronically controlled brake valve device, and another channel which, when the pilot control valve is in the open fail-safe third state, fluidly connects said upstream portion with said downstream portion.

Example 13: A heavy-duty vehicle, comprising:

a lift axle which comprises a brake chamber, a lift bellow configured to control the condition of the lift axle, such that when the pressure in the lift bellow is increased the lift axle is raised to a lift condition and when the pressure in the lift bellow is reduced the lift axle is lowered to a ride condition, and the air supply control arrangement according to any one of Examples 1-12.

Example 14: The heavy-duty vehicle according to Example 13 further comprising:

a main bellow that controls the suspension of the lift axle, such that when the pressure in the main bellow is increased the lift axle is suspended by the main bellow.

Example 15: The heavy-duty vehicle according to Example 13, further comprising:

leaf spring suspension configured to suspend the lift axle.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An air supply control arrangement for a heavy-duty vehicle comprising a lift axle which comprises a brake chamber, the air supply control arrangement comprising:
   an electronically controlled brake valve device, which when opened allows pressurized air received in the electronically controlled brake valve device to be passed to the brake chamber, and when closed prevents pressurized air received in the electronically controlled brake valve device from being passed to the brake chamber, wherein the degree of the opening and/or the duration of the opening of the electronically controlled brake valve device is controlled by an electronic brake request received by the electronically controlled brake valve device,
   a supply passage,
   a pressurized air source for supplying pressurized air to the electronically controlled brake valve device along said supply passage,
   a pilot control valve provided in said supply passage between the pressurized air source and the electronically controlled brake valve device, wherein the pilot control valve has a closed first state in which air from the pressurized air source is prevented from reaching the electronically controlled brake valve device and an open second state in which air from the pressurized air source is allowed to be received by the electronically controlled brake valve device, and
   a pressure-responsive element configured to actuate the pilot control valve and configured to be in fluid communication with a lift bellow that controls the condition of the lift axle, such that when the pressure in the lift bellow is increased so that the lift axle is raised to a lift condition then the pressure-responsive element is activated to actuate the pilot control valve to move to said closed first state, and when the pressure in the lift bellow is reduced so that the lift axle is lowered to a ride condition then the pressure-responsive element is deactivated to allow the pilot control valve to move to said open second state.

2. The air supply control arrangement according to claim 1, wherein the pressure-responsive element is part of or is mechanically connected to the pilot control valve, such that when the pressure-responsive element is subjected to the increased pressure that causes the lift axle to be raised to the lift condition, the pressure-responsive element is moved, causing the pilot control valve to be moved to said closed first state.

3. The air supply control arrangement according to claim 1, further comprising:
   a bleed conduit configured to be in fluid communication with a feed conduit through which pressurized air is fed to the lift bellow, wherein the bleed conduit is configured to bleed air from the feed conduit to the pressure-responsive element, wherein the pressure-responsive element becomes subjected to the same air pressure as the lift bellow.

4. The air supply control arrangement according to claim 1, wherein said pilot control valve is a pressure-actuated pilot control valve.

5. The air supply control arrangement according to claim 1, wherein the pressure-responsive element comprises a pressure switch which is configured to send an electric signal when activated, wherein the supply control valve is configured to be actuated by the electric signal to move to the closed first state.

6. The air supply control arrangement according to claim 1, further comprising:
   a spring device configured to bias the pilot control valve towards said open second state or towards a further state that allows air from the pressurized air source to be received by the electronically controlled brake valve device.

7. The air supply control arrangement according to claim 6, wherein when the pressure-responsive element is subjected to a pressure which results in the pilot control valve being subjected to an actuating force that is greater than the spring force of the spring device, then the pilot control valve is moved to the closed first state.

8. The air supply control arrangement according to claim 1, wherein the pressure-responsive element is a first pressure-responsive element, wherein the air supply control arrangement further comprises:
   a second pressure-responsive element configured to be in fluid communication with a main bellow that controls the suspension of the lift axle, such that when the pressure in the main bellow is increased so that the lift axle is suspended by the main bellow then the second pressure-responsive element is activated to actuate the pilot control valve to move to said open second state.

9. The air supply control arrangement according to claim 8, wherein the pilot control valve has an open fail-safe third state in which air from the pressurized air source is allowed to be received by the electronically controlled brake valve device, wherein when neither the first pressure-responsive element nor the second pressure-responsive element is activated to actuate the pilot control valve, then the pilot control valve is set in the open fail-safe third state.

10. The air supply control arrangement according to claim 9, wherein the spring device provides a spring force that urges the pilot control valve towards the open fail-safe third state.

11. The air supply control arrangement according to claim 9, further comprising:
an alert switch, wherein, when the pilot control valve is set in the open fail-safe third state, the alert switch becomes closed, thereby triggering an alert to the driver.

12. The air supply control arrangement according to claim 1 wherein the pilot control valve comprises two channels:
one channel which, when the pilot control valve is in the open second state, fluidly connects a portion located upstream of the pilot control valve with a portion located downstream of the pilot control valve, the upstream portion extending from the pressurized air source and the downstream portion extending to the electronically controlled brake valve device, and
another channel which, when the pilot control valve is in the open fail-safe third state, fluidly connects said upstream portion with said downstream portion.

13. A heavy-duty vehicle, comprising:
a lift axle which comprises a brake chamber,
a lift bellow configured to control the condition of the lift axle, such that when the pressure in the lift bellow is increased the lift axle is raised to a lift condition and when the pressure in the lift bellow is reduced the lift axle is lowered to a ride condition, and
the air supply control arrangement according to claim 1.

14. The heavy-duty vehicle according to claim 13 further comprising:
a main bellow that controls the suspension of the lift axle, such that when the pressure in the main bellow is increased the lift axle is suspended by the main bellow.

15. The heavy-duty vehicle according to claim 13, further comprising:
leaf spring suspension configured to suspend the lift axle.

* * * * *